Aug. 11, 1959  W. T. BEAN, JR  2,899,658
LEAF-TYPE ELECTRICAL RESISTANCE STRAIN GAGE
Filed April 4, 1957  4 Sheets-Sheet 1
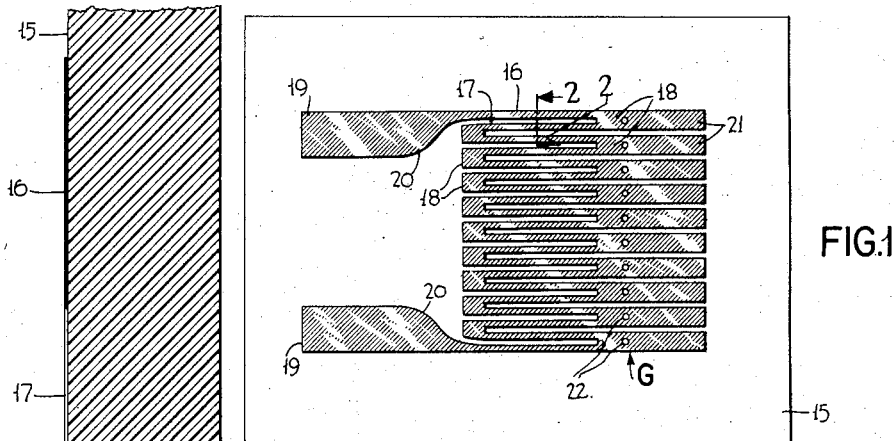
FIG.1
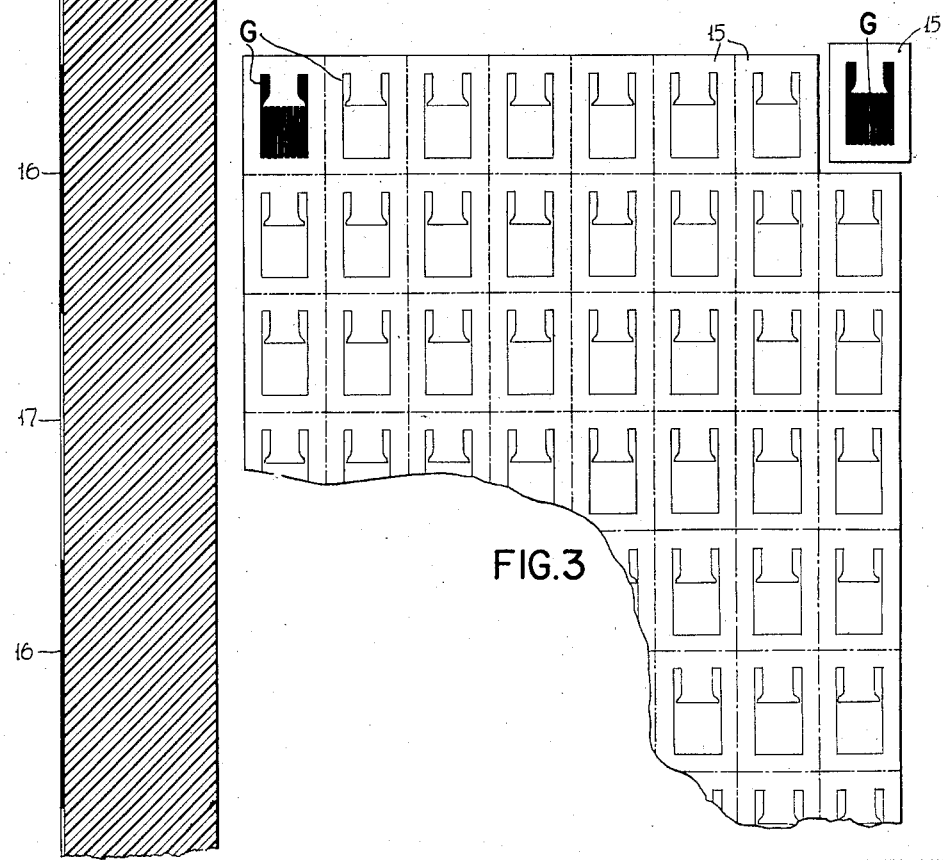
FIG.2
FIG.3
INVENTOR
William T. Bean, Jr.
BY
Wm. R. Glisson
ATTORNEY Aug. 11, 1959   W. T. BEAN, JR   2,899,658
LEAF-TYPE ELECTRICAL RESISTANCE STRAIN GAGE
Filed April 4, 1957   4 Sheets-Sheet 2
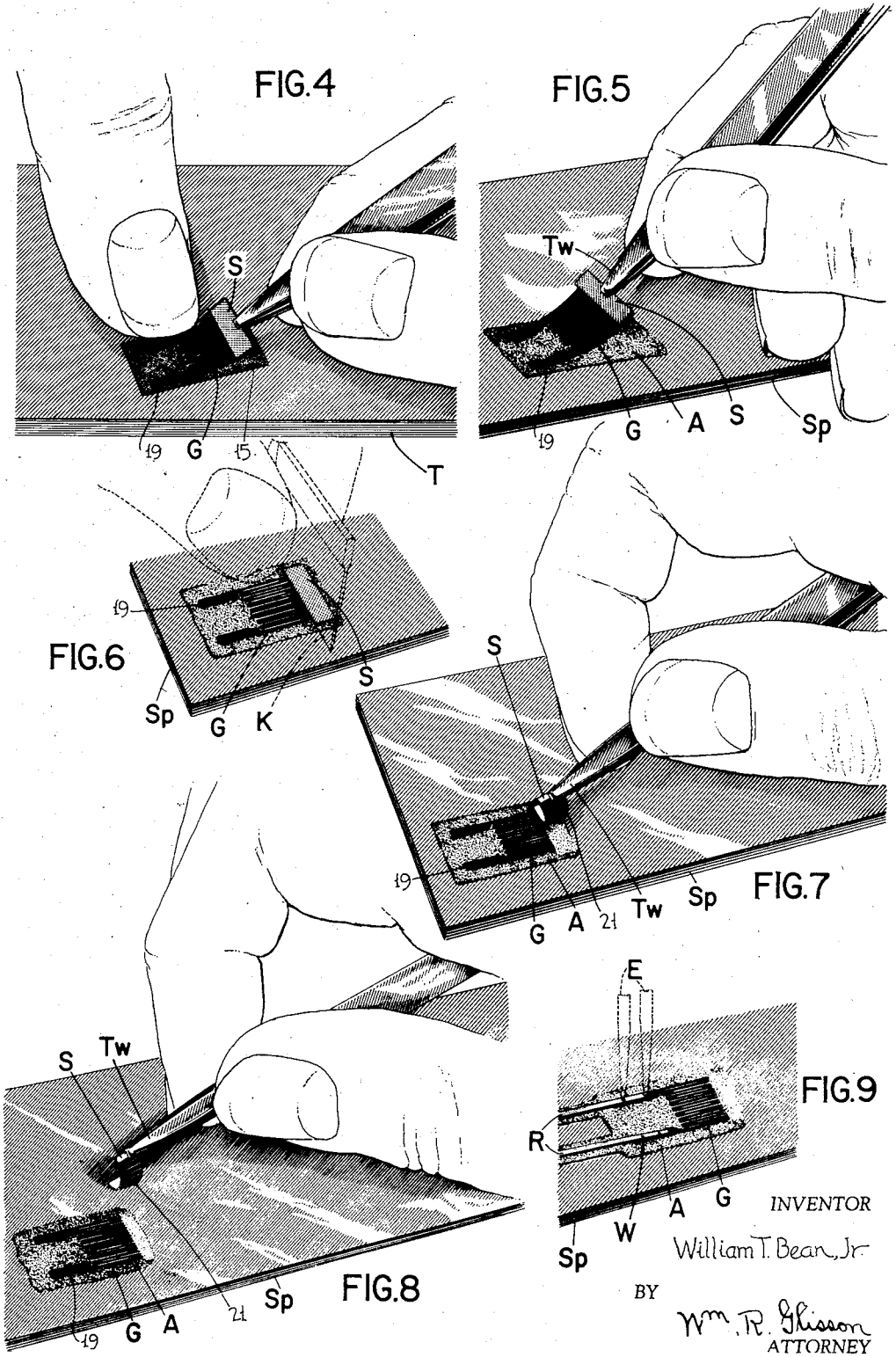
INVENTOR
William T. Bean, Jr.
BY
Wm. R. Glisson
ATTORNEY INVENTOR
William T. Bean, Jr.
BY
Wm. R. Glisson
ATTORNEY

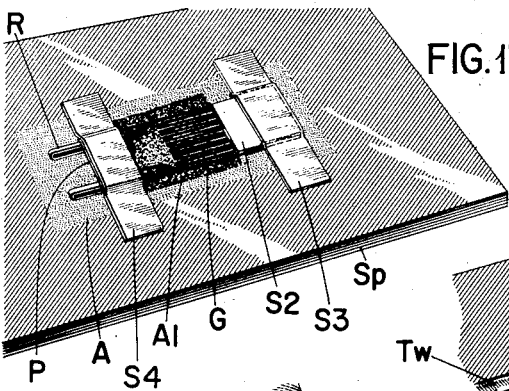
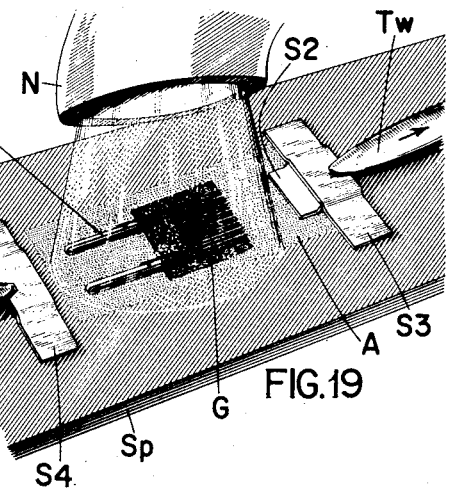
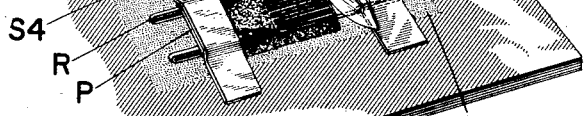
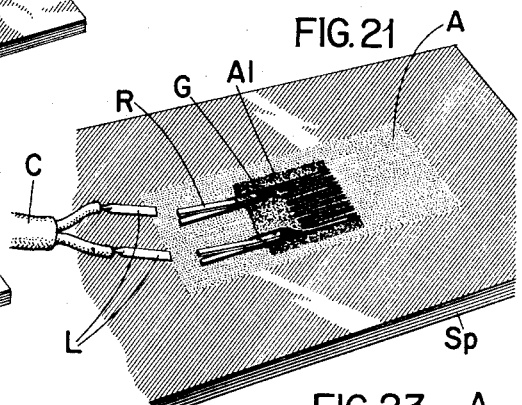
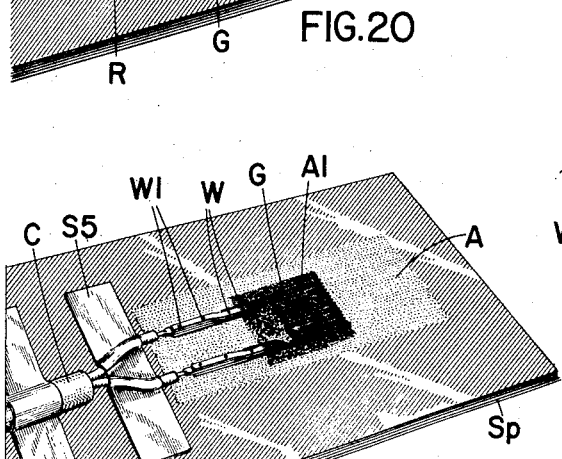
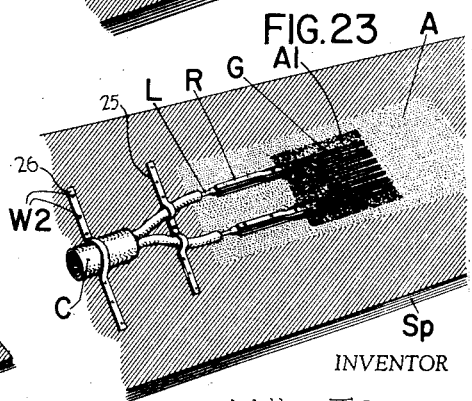

United States Patent Office 2,899,658
Patented Aug. 11, 1959

2,899,658

LEAF-TYPE ELECTRICAL RESISTANCE STRAIN GAGE

William T. Bean, Jr., Detroit, Mich., assignor to Tatnall Measuring Systems Company, Philadelphia, Pa., a corporation of Delaware Application April 4, 1957, Serial No. 650,602

9 Claims. (Cl. 338—2)

This invention relates to an electrical resistance strain gage, particularly to a foil or leaf-type strain gage, and a method of applying it and has for an object the provision of improvements in this art.

One of the particular objects of the invention is to provide a foil or leaf-type strain gage which will be fully responsive to strain in one direction and substantially non-responsive to strain in a transverse direction to overcome the difficulty experienced with filament-type strain gages, whether of metal wire or composition, in registering strains in a transverse direction, due to their uniform cross-section size, as well as in the intended longitudinal direction.

Another object is to provide a foil or leaf-type strain gage which is so thin that it will conform to the test specimen surface even if it has sharp local irregularities in shape, thus overcoming the objection to filament-type strain gages in their inability to conform to such sharp local irregularities.

Another object is to provide a foil or leaf-type strain gage which can be formed and handled as a sheet to avoid the winding operations which are essential with filament-type strain gages in any size and which become practically impossible in very small sizes of strain gages.

Another object is to provide a foil or leaf-type strain gage in which the elements are so wide relative to their thickness that they can carry the required current yet can be secured to the test specimen by adhesive applied only on one side and in a very thin layer, avoiding the necessity of being embedded in cement as is necessary with filament-type gages. They do not require clamping to the specimen as do filament-type strain gages.

Another object is to provide a foil or leaf-type strain gage which is so shaped and supported that it can be maintained in smooth sheet form alone and without a backing sheet and applied to a specimen with only a thin layer of adhesive, thus avoiding the backing support sheet and two layers of cement as are necessary for the use of filament-type strain gages. For high temperature testing, for which the present gage is especially suited, it is impractical to use paper carriers since they will be destroyed by the heat and other sheet backers also tend to give trouble with heat.

Another object is to provide a foil or leaf-type strain gage which can be made in multiple units, as in a large sheet from which a great many individual gage units are formed simultaneously, thus providing very inexpensive gage units as compared to filament-type gage units which can only be made by the separate winding of each unit. The winding operations for filament-type gages become increasingly difficult and expensive as the size decreases; whereas the cost of foil or leaf-type gages may actually decrease with size once the leaf-type sheet stock has been produced.

Another object is to provide a foil or leaf-type strain gage with supporting extensions or handling tabs which aid in keeping the gage sheet smooth and free from wrinkles or folds, which can be held by a handling strip during application, and which can be removed readily with the handling strip after application.

Another object is to provide a foil or leaf-type strain gage having conductor connector extensions or lead tabs which join the body portion of the gage in smooth lines without angular changes in edge outline whereby no point of incipient breakage is present and the very thin gage can be peeled from the carrier sheet without tearing. Fatigue breakage in continued use is also minimized.

Another object is to provide a foil or leaf-type strain gage grid which is so thin compared to the width of an element or run or strip of the grid that heat dissipation is so complete as to avoid change in response due to temperature change, thus avoiding the heating problems encountered with filament-type strain gages and permitting the use of much greater electrical currents and correspondingly greater accuracy in results.

Another object is to provide a foil or leaf-type strain gage of such design that different sizes can be produced by simple photographic enlargement (or reduction) methods without change in strain sensitivity or electrical resistance of the grid.

The above and other objects and advantages of the invention will be apparent from the following description of certain exemplary embodiments, reference being made to the accompanying drawings thereof, wherein:

Fig. 1 is a plan view of a foil or leaf-type strain gage made according to the present invention, the gage being carried on the backing sheet on which it was formed;

Fig. 2 is a greatly enlarged section of a portion of the gage, taken on the line 2—2 of Fig. 1;

Fig. 3 is a plan view of a large sheet showing how a plurality of gage units can be formed by a photo-engraving process and individual units then cut from the sheet;

Fig. 4 is a perspective view showing how a foil gage unit is peeled from the backing sheet on which it was formed;

Fig. 5 is a similar view showing how the foil gage unit is laid down on a test specimen after an insulating and supporting layer has been applied to the cleaned surface of the specimen;

Fig. 6 is a similar view after the gage has been applied and showing the handling tabs being severed from the effective portion of the grid;

Fig. 7 is a similar view showing the handling tab in process of being removed from the foil strain gage proper;

Fig. 8 is a similar view showing the handling tab fully separated;

Fig. 9 is a similar view showing the electric conductor leads being attached to the strain gage, as by spot resistance welding;

Figs. 10 to 23 show a slightly different procedure for applying the gage;

Fig. 10 shows a gage ready for the attachment of a supplemental handling strip to the tear-off handling tabs of the gage;

Fig. 11 shows the preparation of the supplemental handling strip;

Fig. 12 shows the handling strip attached to the handling tabs;

Fig. 13 shows the backing sheet being trimmed preparatory to the attachment of lead ribbons;

Fig. 14 shows the gage lead tabs with lead ribbons being attached, the resistance welding instrumentalities being omitted;

Fig. 15 shows a gage being peeled from its backing sheet, much as in Fig. 4;

Fig. 16 shows the gage being laid down on a precoated specimen much like in Fig. 5;

Fig. 17 shows the gage taped down on the specimen and coated with protective material;

Fig. 18 shows the handling tabs being severed from the grid portion of the gage;

Fig. 19 shows the adhesive strips and handling tabs being removed;

Fig. 20 shows the gage with the ribbon lead loops being cut apart;

Fig. 21 shows the lead wires being assembled with the lead ribbons for attachment;

Fig. 22 shows the lead wires after attachment; and

Fig. 23 shows the lead wires bound down to the specimen.

Figure 10:
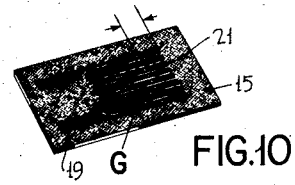

The present foil or leaf-type strain gage is made from very thin rolled leaf material formed from alloys or compositions of known types which are subject to change in conductivity with change in length or strain. Quite a number of alloys are now known which have the desired characteristics in general and the particular alloy to be used will be that which best suits the conditions of a particular test. One such alloy is known as "Constantan" and comprises about 60% nickel and 40% copper; another is known as "Isoelastic" and comprises about 36% nickel, 8% chromium, 0.5% molybdenum, with the remainder largely iron; another is "Karma" comprising 74% nickel, 20% chromium, 3% iron and 3% copper; and another is "Nichrome" comprising 80% nickel and 20% chromium.

Leaf or foil of a thinness of two-ten-thousandths (0.0002") of an inch or less is used. Suitable foil down to fourteen one-hundred-thousandths of an inch (0.00014") has been used, as referred to hereinafter, and the features of grid formation and installation of gages described herein are applicable to gages made even of thinner material as it becomes obtainable. The lower limit of thickness, practically, is the limit of accurate rolling technique and present rolling facilities are available for providing rolled material of the stated thinness, keeping in mind that most materials which are suitable for these gages are very difficult to roll and also that only a very small percentage of variation in thickness can be tolerated.

Such foil gages as have been provided heretofore have been limited in thinness because it was impossible to handle foil grids of less than about 0.0005" thickness. Even for these it was necessary to provide carrier handlers or fixtures. The present invention permits extremely thin foil to be used by providing handling tabs directly on the gage and by providing an improved method of applying the gage. When it is noted that the stiffness of a sheet or foil varies as the cube of its thickness, the desirability of using the thinnest possible foil will be appreciated. Another great advantage of using very thin foil is that it can be chemically milled through without appreciable undercutting and loss of accuracy whereas with somewhat thicker foil it is almost impossible to make an acceptably accurate gage.

As shown in Fig. 3, a sheet of such thin rolled leaf which has been electro-polished has been laid on a backing sheet 15 and subjected to photo-engraving processes and chemical etching or milling processes of known type to form a plurality of separate gage units G. Two such units are shown in full lines in Fig. 3 and one such unit is shown in greatly enlarged size in Fig. 1. The backing sheet may be a plastic material, coated with a pressure sensitive adhesive, on which the large sheet of foil or leaf is firmly and smoothly pressed. Then a fine-grained photographic emulsion is very evenly applied and images of all gage units are formed photographically. By subsequent etching or chemical milling operations the metallic leaf is removed to leave the fully formed spaced gage units. These can be cut from the backing sheet as required, one such separated unit being shown at the upper right corner of Fig. 3. The gage units, thus cut off, are usually enclosed in a paper or cardboard folder and envelope for protection.

A gage unit, with a portion of the backing sheet 15, is shown in Fig. 1. A gage unit could be as large as the full-size showing of Fig. 1 but for most contemplated uses it is very much smaller, say 1/16" to 1/2" in effective length.

The relative dimensions of an exemplary embodiment of the gage can be observed from Figs. 1 and 2. Assuming the foil thickness to be 0.00014", the width of a single strip 16 of the grid will be 0.0095" and the width of the alternately end-opening spaces or slots 17 between strips will be 0.0095". This means that the width of each strip is about 68 times its thickness. This is shown to scale in Fig. 2 for three grid strips. This relationship gives good stability against side bending in handling the gage. These characteristics are found in a range of width from 50 to 150 times the thickness. A foil of this thinness can be chemically milled through without much undercutting and the desired accuracy and uniformity can be obtained, as mentioned above. The length of a grid strip 16 is 0.1875". The junction portions 18 connecting the grid strips at alternate ends are relatively very long, as compared to their width, to carry large currents and have little effect in the changes in current produced by strain. The length is 0.0355".

Lead connection tabs 19 are provided for the outer grid strips. These tabs are very wide, 0.070", so as to carry relatively large currents, hence have little effect on the changes in current due to strain. The large width of the tabs 19 extends down very close to the grid end and the enlargement from the strip width is made by a rapid but smooth curved edge 20. No sharp corners are left at any point, hence there is the least chance of starting a tear or fold when the gage is handled, especially when peeling it from its backing sheet, as will be described hereinafter. The edge curve here emerging from a strip has the general form of a parabola which joins in a smooth curve with the straight edge of the widened lead tab.

At the end opposite the lead tabs 19, which may be referred to as the lower end, there are provided relatively long (as compared to the junction portions 18) extensions or handling tabs 21 projecting down from the junction portions 18. Between the junction portions 18 and the extensions 21 perforations or holes 22 are provided. These holes are preferably round so as to avoid any tendency to start lines of tear accidentally, but are of such size, 0.01" diameter as compared to junction portion width of 0.0285", as to provide a line of weakness for removing the handling tab extensions 21, as will be described hereinafter. The handling tab extensions are very useful in handling the foil gage units, especially in stripping off the backing sheet, and are intended to be removed but they could be left on since they are beyond the junction portions which are in circuit with the grid strips and lead tabs. To provide for the situation where the extensions might be left on the gages and also for testing each gage before it is used the slots or spaces 17 extend the full length of the extensions.

The gage may be applied to a specimen in the manner shown in Figs. 4 to 9.

In Fig. 4 the gage G with its backing sheet 15 is laid on a table T and a handling strip S which has been adhesively secured across the handling tabs 21, either at the factory or on the job, is lifted, as by a pair of tweezers Tw, to carry with it the foil gage until it is peeled from the backing sheet. The handling strip S has greater adhesion to the gage than the gage has with its backing sheet so the handling strip holds the gage securely while it is being stripped.

Prior to the time when the gage is stripped from its backing sheet, the specimen Sp to be tested, Fig. 5, has been thoroughly cleaned for an adequate area and coated with a suitable insulating material A. While still holding the gage by the handling tabs and strip, the gage is laid down on the coating A on the specimen Sp, the ends of the lead tabs 19 being laid down first. The strip S holds the handling tabs 21 in proper spacing and this keeps the grid portion of the gage in proper shape. This is a great advantage over the method by which formerly known foil gages without the handling tabs had to be applied, for they had to be laid down with the backing sheet uppermost, then the backing sheet stripped off, and then the gage held down by adhesive strips applied directly upon the grid portion and lead tabs while the lead ribbons and lead wires were attached. Prior foil gages, having to be relatively thick for the reasons stated, positively required a sticky adhesive to be applied on the specimen before the gage was applied; the present gage can be so thin that it acts much in the way gold leaf is found to act, that is it seems to be attracted to a surface and the adhesive can be applied either before or after the gage is laid down. The present foil lies down so closely that if adhesive (of the proper type, of course) is applied above the gage it will be drawn under the foil by a kind of "Mueller" or capillary action. The backing sheet, lying upon the top of the gage, was hard to remove without tearing or disarranging the gage, particularly since the backing sheet itself became adhesively bonded to the specimen at all places which were not covered by the gage; and the adhesive strips, because of their stronger adhesive coating, were yet harder to remove from the gage without destroying it. With the present gage and its method of application there is never anything adherently placed on the outer surface of the active portion of the gage but only on the handling tabs which are cut off or which do not affect the calibration of the gage even if left on. The junction portions 18 have such great conductivity relative to the grid strips or runs 16 that the presence or absence of the handling tabs 21 has no effect on the flow of current through the grid.

After the grid has practically been smoothly laid down on the specimen, as shown in Fig. 6, it may be held down by an adhesive strip, as of cellophane tape (with a pressure sensitive adhesive), placed across the adhesive handling strip S already applied. At this time the lead connections to the lead tabs could be applied. Or these lead connections can be applied at a later stage, as indicated in Fig. 9.

In Figs. 4 to 9 the main advantages of the new gage shape are brought out and for this reason the procedure for making the lead connections has been subordinated in order to bring out the great advantages of having the handling tabs and in having lead tabs with smoothly curved surfaces without sharp breaks in curvature such as would start tearing when the gage is stripped and handled. Moreover, the lead attaching procedure itself is not very different from known practices.

Still referring to Fig. 6, and assuming that the handling tabs 21 are to be removed, the end junction portions are preferably cut across at the line of the holes 22 so that the handling tabs may more easily be removed. A knife K may be pressed down or rocked across the tabs to cut them off. Then, as shown in Figs. 7 and 8, the handling strip S can be pulled up to pull off the handling tabs with it. The adhesive on the specimen still has less hold on the tabs than does the strip S. Another method is to slide the strip S off the handling tabs by pulling it edgewise toward the bottom and then to remove the handling tabs, one by one, by pulling them endwise toward the bottom. When the handling tabs are pulled off one by one in this way the gage will not be removed and the tabs will readily break off at the weakening holes; but it is preferable, even so, to hold a knife down on the line of separation to be doubly certain that the gage proper is not disarranged. Tweezers Tw are used for pulling.

In Fig. 9 there is shown the lead ribbons R being welded to the lead tabs 19 by resistance welding electrodes E. The welds are indicated at W. After welding, the insulated lead wires, not shown, are welded to the lead ribbons. Then the lead tabs, lead ribbons and lead wires are secured down on the specimen.

If outer protection is desired the gage may be covered by any suitable protective means.

Having noted one method of applying the gage to a specimen with emphasis on the salient functions of the novel gage construction, there will now be described, by reference to Figs. 10 to 23, a more specific method of applying the gage to a specimen.

Fig. 10 shows the gage as received, similar to Fig. 1 but to smaller scale, ready for the sequence of operations.

Figure 11:
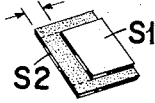

Fig. 11 shows a supplemental handling strip comprising a paper strip S1 and an adhesive strip S2, being pre-assembled upside down.

Figure 12:
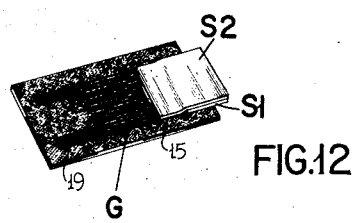

In Fig. 12 there is shown the paper handling strip S1 which has been cut to the width of the gage and placed against the ends of the handling tabs 21. The cellophane tape strip S2, which was secured to the paper strip S1, is pressed down on the handling tabs 21 so that its upper end is even with the line of weakening holes 22. The strips S1 and S2 together may be referred to as a supplemental pull tab or handling strip and if applied at the factory a single strip with an area of adhesive just equal to the handling tab area may be used instead of the two-strip component illustrated.

Figure 13:
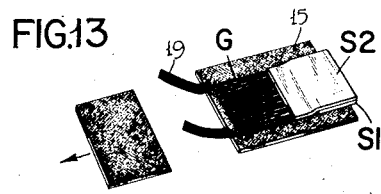
Figure 14:
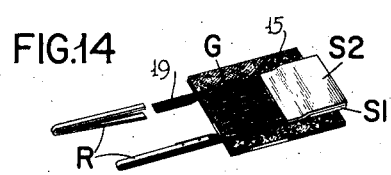

In Fig. 13 the lead tabs 19 have been separated from the backing sheet 15 and the upper end of the backing sheet has been cut off just above the upper end of the grid portion of the gage to leave the lead tabs exposed for access. Then two pieces of lead ribbon R are cut to about 1½" length and folded in the middle and the open ends welded on opposite sides of the lead tabs, as shown in Fig. 14. Two or more welds W are shown for each lead tab.

Figure 15:
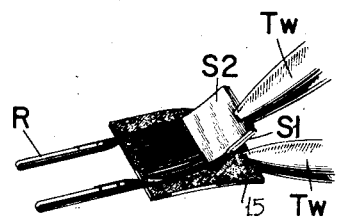

In Fig. 15 the gage is shown in process of being peeled from its backing strip 15 by lifting with the handling strips S1, S2.

Figure 16:
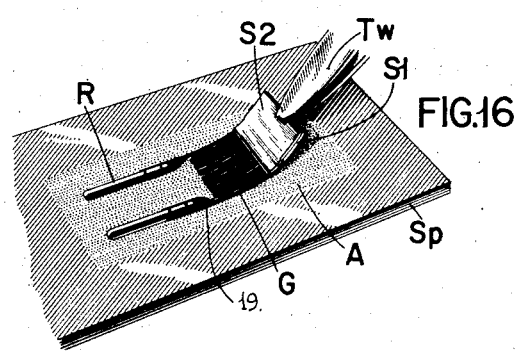

A suitable area on a specimen Sp such as to take the gage and its leads will be assumed to have been cleaned and coated with suitable insulating (and, if desired, adhesive) material A. As shown in Fig. 16, the gage, while still held by its handling strips S1, S2, is laid down on the coated specimen, the outer ends of the lead ribbons R being touched down first.

As shown in Fig. 17, the gage is made fast by a couple of over-length adhesive strips S3, S4, one S3 being placed on the handling strips S1, S2 and the other S4 being placed on the lead ribbons R. Preferably a paper strip P is placed over the ribbons before the tape strip S4 is applied. This serves to allow adjustment of the ribbons and also prevents soiling the ribbons with the adhesive on the strip. The exposed portion of the gage between the strips S3 and S4 is now coated with adhesive. Suitable known adhesives will wet both the specimen and the under surface of the gage. The overcoating is indicated at A1.

Next, as shown in Fig. 18, the handling tabs 21 are severed from the gage grid along the line of holes 22, and then, as shown in Fig. 19, the adhesive tape strips S3 and S4 are removed by an edgewise sliding movement, the strips preferably being heated, as by the hot air flow from a nozzle N of a heater-blower, to soften the adhesive. The tab strips S1 and S2 and the handling tabs 21 usually come off with the adhesive strip S3 but, if not, they can be pulled off separately.

As shown in Fig. 20, the loop ends of the lead ribbons are severed and the entire gage up to about the mid-length of the lead ribbons is coated with a protective material. Scissors Sc are shown in Fig. 20.

As shown in Fig. 21, the ends of wire leads L are stripped and flattened and placed between the ends of the lead ribbons R for welding.

As shown in Fig. 22, the lead wires may be held down by one or more strips of cellophane tape S5 which are later removed. It will be assumed that a two-wire cable C is used and that the insulation of both the individual wires as well as the two-wire cable assembly is adequate for the temperatures to which the gage is to be subjected. The welds between the lead ribbons and lead wires are shown at W1.

Finally, as shown in Fig. 23, after the adhesive strips S5 have been removed and the exposed metal parts have been coated with protective material, the insulated wires and cable are lashed down firmly to the specimen, as by placing strips of ribbon 25, 26 down over them and spot welding to the specimen as at W2. Care is taken to see that uninsulated metallic parts are finally coated with a suitable protective material. The coatings on the outer surface of the gage are for protection only and have no effect on its action as a gage.

It has already been noted how the design of the gage contributes to its installation on a specimen in the most expeditious manner and with the least possibility of injury to the gage. There is no need to clamp the gage down as is usually required with filament type gages.

At the same time the gage is very easy and relatively inexpensive to manufacture. It is not entirely necessary to apply adhesive before the gage is laid down as is required by the thicker foil gages heretofore feasible to use.

No carrying handler or fixture is needed as required by prior gages.

Tearing and fatigue failure of the lead tabs is minimized.

While one embodiment of the gage and a couple of methods of installation have been described for purposes of illustration, it will be understood that there may be various embodiments and modifications within the general scope of the invention.

What is claimed is:

1. An electrical resistance strain gage which is formed of metal leaf material which is so thin and delicate that it is subject to tearing and disarrangement during installation face-down upon a test body, comprising a flat zig-zag or serpentine grid formed of narrow parallel resistance strips, and wider connecting portions arranged in alternation at opposite ends of the narrow resistance strips, leaving alternate spacing slots from opposite ends between joined pairs of narrow resistance strips, the connecting portions at one end of the grid all having integral elongated extensions or handling tabs by which the grid can be held and kept smooth, the handling tab extensions being relatively long as compared to the end connecting portions to which they are joined and being unslotted throughout their length but divided from each other by the continuation of the slots of the grid.

2. An electrical resistance strain gage which is formed of metal leaf material which is so thin and delicate that it is subject to tearing and disarrangement during installation face-down upon a test body comprising a flat zig-zag or serpentine grid formed of narrow parallel resistance strips, and wider connecting portions arranged in alternation at opposite ends of the narrow resistance strips, leaving alternate spacing slots from opposite ends between joined pairs of narrow resistance strips, the connecting portions at one end of the grid all having integral elongated extensions or handling tabs by which the grid can be held and kept smooth, the handling tab extensions being relatively long as compared to the end connecting portions to which they are joined and being unslotted throughout their length but divided from each other by the continuation of the slots of the grid and being weakened at their point of connection with the connecting portions so as to be readily separated therefrom.

3. An electrical resistance strain gage which is formed of metal leaf material which is so thin and delicate that it is subject to tearing and disarrangement during installation face-down upon a test body comprising a flat zig-zag or serpentine grid formed of narrow parallel resistance strips, and wider connecting portions arranged in alternation at opposite ends of the narrow resistance strips, leaving alternate spacing slots from opposite ends between joined pairs of narrow resistance strips, the connecting portions at one end of the grid all having integral extensions or handling tabs by which the grid can be held and kept smooth, the handling tab extensions being relatively long as compared to the end connecting portions to which they are joined and being unslotted throughout their length but divided from each other by the continuation of the slots of the grid, the outermost narrow resistance strips being extended beyond the grid to form lead tabs at the end opposite their connection with the grid and being quickly widened on the inner edge beyond the end of the grid in smooth curvature without a sharp break in the edge line.

4. An electrical resistance strain gage which is formed of metal leaf material which is so thin and delicate that it is subject to tearing and disarrangement during installation face-down upon a test body, comprising a flat zig-zag or serpentine grid formed of narrow parallel resistance strips, and wider connecting portions arranged in alternation at opposite ends of the narrow resistance strips, leaving alternate spacing slots from opposite ends between joined pairs of narrow resistance strips, the connecting portions at one end of the grid all having integral elongated extensions or handling tabs by which the grid can be held and kept smooth, the handling tab extensions being relatively long as compared to the end connecting portions to which they are joined and being unslotted throughout their length but divided from each other by the continuation of the slots of the grid, and being weakened by perforations at their point of connection with the connecting portions so as to be readily separated therefrom, the outer narrow resistance strips being extended beyond the grid at the end opposite the connection with the grid and being widened on the inner edge beyond the end of the grid in smooth curvature without a sharp break in the edge line.

5. An electrical resistance strain gage which is formed of metal leaf material which is so thin and delicate that it is subject to tearing and disarrangement during installation face-down upon a test body, comprising a flat zig-zag or serpentine grid formed of narrow parallel resistance strips, and wider connecting portions arranged in alternation at opposite ends of the narrow resistance strips, leaving alternate spacing slots from opposite ends between joined pairs of narrow resistance strips, the outermost narrow resistance strips being extended beyond the grid to form lead tabs at the end opposite their connection with the grid and being rapidly widened from the strips in a parabolic curve on their inner edges and joining the straight sides of the widened tabs in smooth curvature.

6. A foil or leaf type strain gage formed of metal leaf material which is so thin and delicate that it is subject to tearing and disarrangement during installation face-down upon a test body, comprising a grid portion including a plurality of resistance strips connected at alternate ends by junction portions, lead connection tabs formed as extensions of the outer strips disposed beyond the junction portions at one end of the grid, handling extension portions extending from the ends of the junction portions at the end of the grid opposite the tabs and having a line of weakening perforations between the junction portions and the extension portions, and a handling strip of stronger material adhesively attached to the extension portions for removing them from the grid portion.

7. A foil or leaf type strain gage formed of metal leaf material which is so thin and delicate that it is subject to tearing and disarrangement during installation face-down upon a test body, comprising a grid portion including a plurality of resistance strips connected at alternate ends by junction portions, lead connection tabs formed as extensions of the outer strips disposed beyond the junction portions at one end of the grid, handling extension portions extending from the ends of the junction portions at the end of the grid opposite the tabs, and a handling strip of stronger material adhesively attached to the extension portions for tearing them from the grid portion.

8. The method of applying to a specimen a backing-sheet-supported foil grid strain gage formed of metal leaf foil material which is so thin and delicate that it is subject to tearing and disarrangement during installation face-down upon a specimen, the foil grid having lead tabs at one end and handling extension portions across the end opposite the lead tabs, which comprises, sticking a handling strip across the handling extension portions, pulling on the handling strip to peel the gage from its backing sheet, holding the gage evenly by the handling strip and laying the gage down on a specimen, lead tabs first, and subsequently removing the handling strip from the specimen.

9. The method of applying to a specimen a backing-sheet-supported foil grid strain gage formed of metal leaf foil material which is so thin and delicate that it is subject to tearing and disarrangement during installation face-down upon a specimen, the foil grid having lead tabs at one end and handling extension tabs at the other end, which comprises, engaging and pulling evenly on all the handling tabs together to peel the gage from its backing sheet, holding the gage evenly by the handling tabs and laying it down on a coated specimen, lead tabs first, and subsequently removing the handling tabs from the gage.

References Cited in the file of this patent

UNITED STATES PATENTS

| | | |
|---|---|---|
| 1,721,933 | Swain | July 23, 1929 |
| 2,457,616 | Van Dyke | Dec. 28, 1948 |
| 2,569,714 | Gregory | Oct. 2, 1951 |
| 2,810,227 | Richards | Oct. 22, 1957 |
| 2,819,196 | Munro | Jan. 7, 1958 |

UNITED STATES PATENT OFFICE

CERTIFICATE OF CORRECTION

Patent No. 2,899,658 August 11, 1959

William T. Bean, Jr.

It is hereby certified that error appears in the printed specification of the above numbered patent requiring correction and that the said Letters Patent should read as corrected below.

Column 5, line 35, before "no" insert -- practically --; line 37, after "had" strike out -- practically --; column 8, line 5, before "extensions" insert -- elongated --.

Signed and sealed this 26th day of January 1960.

(SEAL)
Attest:

KARL H. AXLINE
Attesting Officer

ROBERT C. WATSON
Commissioner of Patents